(12) United States Patent
McPheeters et al.

(10) Patent No.: US 11,374,532 B2
(45) Date of Patent: Jun. 28, 2022

(54) CABLE HOLDER ASSEMBLIES FOR A SOLAR PANEL SYSTEM

(71) Applicant: Sunrun South LLC, San Luis Obispo, CA (US)

(72) Inventors: Greg McPheeters, Santa Cruz, CA (US); Emily Figurski, Santa Cruz, CA (US); Ezekiel Ferguson, Santa Cruz, CA (US); Marty Affentranger, Santa Cruz, CA (US)

(73) Assignee: Sunrun South LLC, San Luis Obispo, CA (US)

( * ) Notice: Subject to any disclaimer, the term of this patent is extended or adjusted under 35 U.S.C. 154(b) by 0 days.

(21) Appl. No.: 16/189,212

(22) Filed: Nov. 13, 2018

(65) Prior Publication Data

US 2019/0149087 A1    May 16, 2019

Related U.S. Application Data

(60) Provisional application No. 62/585,230, filed on Nov. 13, 2017.

(51) Int. Cl.

| | |
|---|---|
| H02S 40/34 | (2014.01) |
| F16L 3/10 | (2006.01) |
| H02S 30/10 | (2014.01) |
| F16L 3/223 | (2006.01) |
| H02G 3/32 | (2006.01) |
| F16L 3/24 | (2006.01) |

(Continued)

(52) U.S. Cl.
CPC ............ *H02S 40/34* (2014.12); *F16L 3/1033* (2013.01); *F16L 3/2235* (2013.01); *F16L 3/24* (2013.01); *H02G 3/32* (2013.01); *H02S 30/10* (2014.12); *H02S 40/30* (2014.12); *F16L 3/04* (2013.01); *H02S 40/32* (2014.12)

(58) Field of Classification Search
CPC .......... H02S 40/34; H02S 30/10; H02S 40/30; H02S 40/32; F16L 3/1033; F16L 3/2235; F16L 3/24; F16L 3/04; H02G 3/32
See application file for complete search history.

(56) References Cited

U.S. PATENT DOCUMENTS 3,210,030 A * 10/1965 Ramsey .................. F16L 3/233
                                                           24/339
3,494,580 A *  2/1970 Thorsman ................ F16L 3/04
                                                           24/339

(Continued)

*Primary Examiner* — Christopher Garft
(74) *Attorney, Agent, or Firm* — Kramer Levin Naftalis & Frankel LLP

(57) ABSTRACT

Wire or cable holder assemblies employed in a solar power system are disclosed. In some embodiments, an assembly could include a cap and a base configured with channels. When the cap and the base are clamped to an object (e.g., a solar module frame), enclosures defined by the channels and a surface of the solar frame module are formed to hold cables. In some embodiments, an assembly could include a plunger with at least one leg and a base that includes a receptacle for receiving the plunger and a hook for holding electrical cables. A leg include a rack having teeth adapted to fall into notches or spaces formed by complementary teeth of a pawl found in the receptacle that forms a ratchet which permits insertion of the plunger into the receptacle but not an extraction. If extraction is desired, an external force may be applied to release the pawl.

12 Claims, 17 Drawing Sheets

(51) Int. Cl.
*H02S 40/30* (2014.01)
*H02S 40/32* (2014.01)
*F16L 3/04* (2006.01)

(56) References Cited

U.S. PATENT DOCUMENTS

| | | | | | |
|---|---|---|---|---|---|
| 4,118,838 | A * | 10/1978 | Schiefer | ............... | F16L 3/13 248/68.1 |
| 4,183,120 | A * | 1/1980 | Thorne | ............... | F16L 3/233 24/456 |
| 4,557,455 | A * | 12/1985 | Benjamin | ............ | G09F 3/0323 248/496 |
| 4,835,933 | A * | 6/1989 | Yung | ............... | E04C 5/168 52/685 |
| 5,597,280 | A * | 1/1997 | Stern | ............... | F16B 21/088 24/453 |
| 5,675,128 | A * | 10/1997 | Simon | ............... | H02G 3/32 174/152 G |
| 6,126,122 | A | 10/2000 | Ismert | ............... | F16L 3/243 24/271 |
| 6,463,631 | B2 * | 10/2002 | Noda | ............... | F16L 3/1025 248/68.1 |
| 6,666,425 | B1 * | 12/2003 | Ferguson | ............ | A47G 1/202 248/495 |
| 6,857,608 | B2 * | 2/2005 | Avinger | ............ | A01G 5/04 248/339 |
| 7,540,451 | B2 * | 6/2009 | Leyden | ............ | F16L 3/1218 248/71 |
| 9,915,430 | B2 * | 3/2018 | Pianezze | ............ | F24C 3/103 |
| 2003/0218111 | A1 * | 11/2003 | Labeirie | ............ | H02G 3/30 248/228.1 |
| 2006/0131465 | A1 * | 6/2006 | Lynch, Jr. | ............ | F16L 3/2235 248/68.1 |
| 2012/0037765 | A1 * | 2/2012 | Guthke | ............ | H02G 3/32 248/67.5 |
| 2012/0049011 | A1 * | 3/2012 | Liu | ............ | H02G 3/32 248/68.1 |
| 2012/0097804 | A1 * | 4/2012 | Liu | ............ | H02G 3/26 248/68.1 |
| 2012/0241583 | A1 * | 9/2012 | Potgieter | ............ | A47G 1/202 248/475.1 |
| 2015/0320242 | A1 * | 11/2015 | Potgieter | ............ | A47G 1/16 248/477 |
| 2017/0227141 | A1 * | 8/2017 | Toll | ............ | F16L 3/1075 |
| 2019/0036314 | A1 * | 1/2019 | Toll | ............ | F16L 3/237 |

* cited by examiner

CABLE HOLDER ASSEMBLIES FOR A SOLAR PANEL SYSTEM

CROSS-REFERENCE TO RELATED APPLICATION

This application claims the benefit of U.S. Provisional Patent Application Ser. No. 62/585,230, filed Nov. 13, 2017, which is incorporated by reference herein in its entirety.

BACKGROUND

Electricity-generating solar panels may be employed separately or grouped in an array. To hold each solar panel, a solar panel module may be employed which, in turn, may be mounted to an installation surface using surface mount assemblies. Because solar panels generate electricity, electrical cables may be used to deliver the electricity to an electrical power component and/or system for subsequent use. When a number of solar panel modules are installed in array, there are numerous electrical wires or cables present that are located above the installation surface that, without a wire or cable management system, may meander or run sporadically in numerous directions above, below, and/or within the array or end up in a messy entanglement of wires.

SUMMARY

Embodiments of the inventive concepts disclosed herein are directed to a wire or cable management system utilizing cable holder assemblies, a component mounting assembly, and/or cable support placed on solar panel modules. When employed, these may provide a structured and/or ordered manner in which electrical cables may be routed to prevent or reduce cables from meandering or running in numerous directions above, below, and/or within the array of solar panel module or end up in a messy entanglement of wires.

In one aspect, embodiments of the inventive concepts disclosed herein are directed to a first cable holder assembly. The first cable holder assembly could include a cap, a base with one or more channels, and a device for coupling the cap to the base. Together with a surface of an object, an enclosure for each channel(s) is formed when covered by a surface of an object.

In a further aspect, embodiments of the inventive concepts disclosed herein are directed to a plurality of second cable holder assemblies. Each second cable holder assembly could include a plunger with a cap and a leg component extending from the cap; and a base comprised of a receptacle and at least one hook. The leg component could include a rack of teeth, and the receptacle could include a pawl with teeth and receive an insertion of the leg component.

In a further aspect, embodiments of the inventive concepts disclosed herein are directed to a component mounting assembly. The component mounting assembly could include a lower body having a pivoting end enclosure and a slot-forming member, an upper body having pivoting and clamping ends, and a device for coupling the lower body to the upper body. The pivoting end enclosure could receive the pivoting end, the slot-forming member and a surface of the lower body could form a slot for receiving an interfacing component, and the clamping could clamp the interfacing component to the lower body when a clamping force is imparted by the coupling device.

In a further aspect, embodiments of the inventive concepts disclosed herein are directed to a cable support. The cable support could include a member having a channel and a pair of outer portions.

BRIEF DESCRIPTION OF THE DRAWINGS

For a fuller understanding of the inventive embodiments, reference is made to the following description taken in connection with the accompanying drawings in which.

DETAILED DESCRIPTION

In the following description, several specific details are presented to provide a thorough understanding of embodiments of the inventive concepts disclosed herein. One skilled in the relevant art will recognize, however, that embodiments of the inventive concepts disclosed herein can be practiced without one or more of the specific details, or in combination with other components, etc. In other instances, well-known implementations or operations are not shown or described in detail to avoid obscuring aspects of various embodiments of the inventive concepts disclosed herein.

Figure 1A:
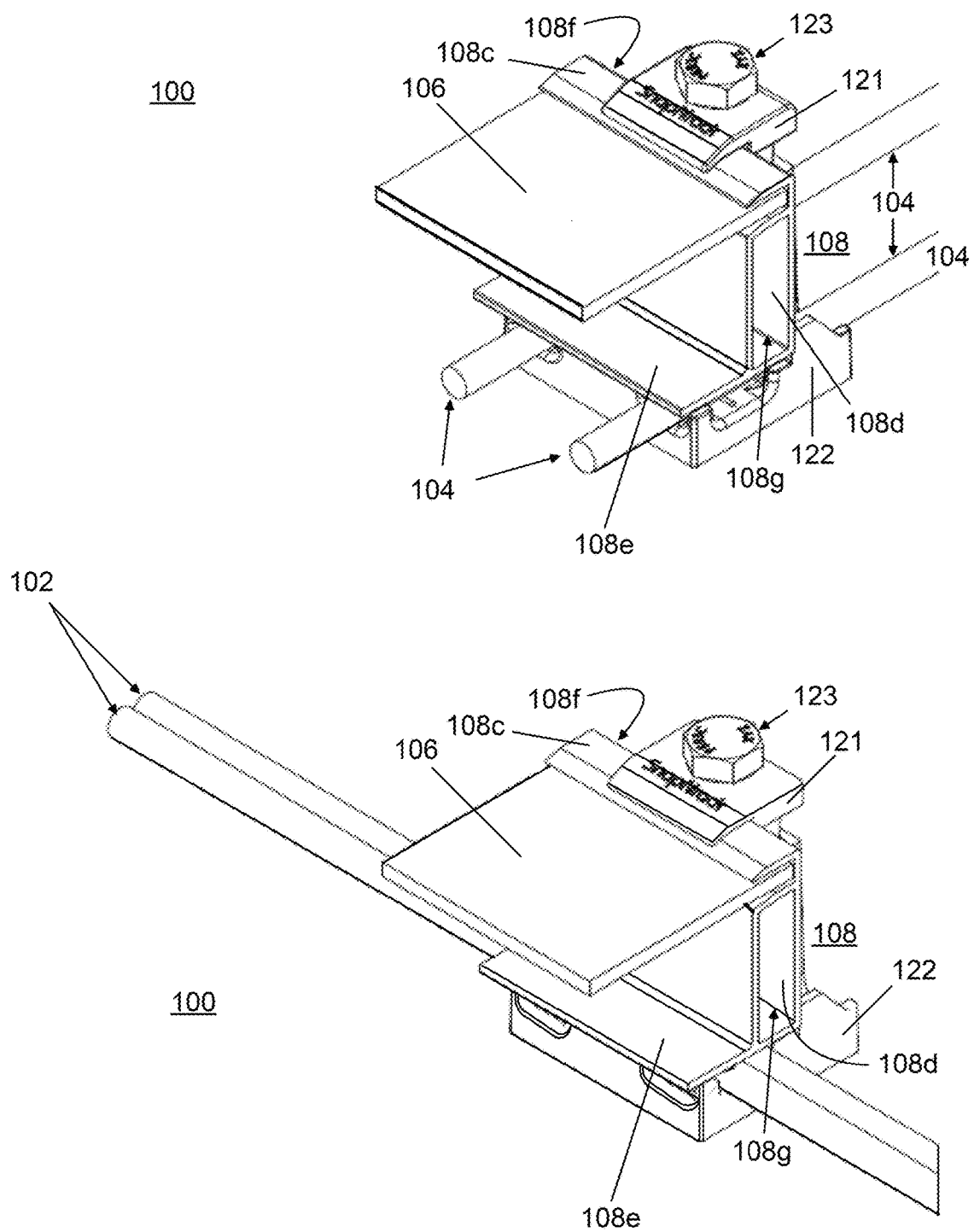
FIG. 1A illustrates two orientations of a frame cable holder assembly, in accordance with some embodiments.

FIG. 1A illustrates two orientations of frame clamping system 100 to facilitate a placement of one or more electrical cables 102 and/or 104 within an array or grouping of solar modules. Each solar module could include electricity-generating solar panel 106 supported by and enclosed on the sides module frame 108 having upper member 108c, vertical member 108d, and lower member 108e. Upper corner 108f is formed along an inner intersection of upper member 108c and vertical member 108d, and a lower corner 108g is formed along an inner intersection of vertical member 108d and lower member 108e. First cable holder assembly 120 may include cap 121, base 122, and fastener 123 and employed to clamp or support cables 102 or 104 near or against module frame 108. Cables 102 run parallel to module frame 108 in a first orientation of frame clamping system 100; in a second orientation, cables 104 run perpendicular to module frame 108.

Figure 1B:
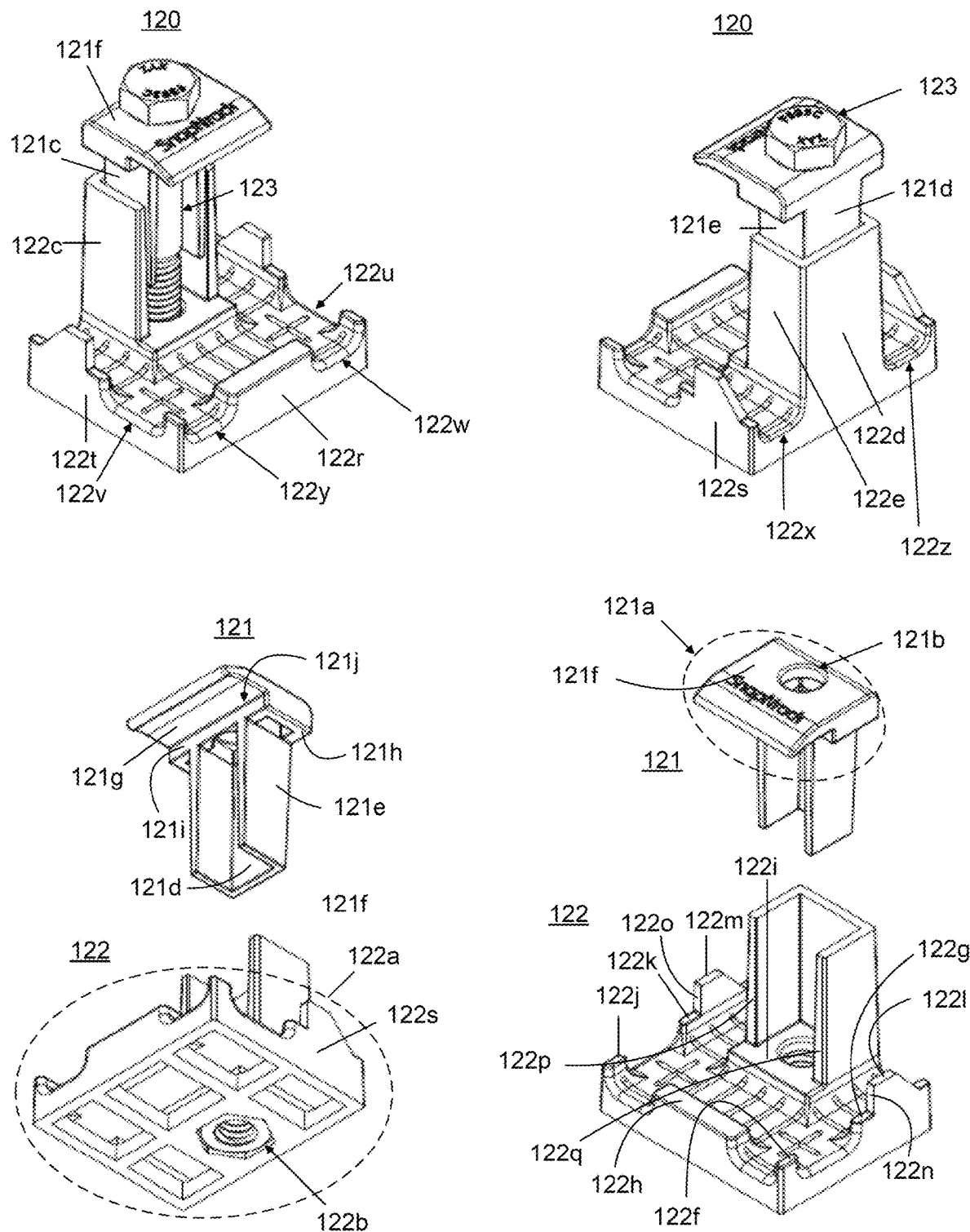
FIG. 1B illustrates two perspective views and two exploded views of the frame cable holder assembly, in accordance with some embodiments.

FIG. 1B illustrates two perspective views and two exploded views of cable holder assembly 120. Cap 121 could include horizontal member 121a with aperture 121b and three vertical members 121c, 121d, and 121e forming a U-shaped channel and extending away (downward) from horizontal member 121a in a substantially perpendicular direction. Horizontal member 121a could include upper surface 121f and lower surfaces 121g and 121h separated by intersecting vertical surface 122i, where the intersection of lower surface 122g and vertical surface 122i forms upper corner 122j spanning the intersection.

When cable holder assembly 120 is clamped to module frame 108, upper corner 108f of module frame 108 may be placed against upper corner 122j during the tightening of fastener 123 until lower surface 121g engages upper member 108c with a suitable amount of clamping force.

Base 122 could include horizontal member 122a with aperture 122b and three vertical members 122c, 122d, and 122e forming a U-shaped channel and extending away (upward) from horizontal member 122a in a substantially perpendicular direction. Horizontal member 122a could include lower surfaces 122f through 122k, inclusive, that are substantially-planar to one another; upper surfaces 122l and 122m; vertical surface 122n in between lower surfaces 122g and 122l; vertical surface 122o in between lower surfaces 122k and 122m; and sides 122p through 122t, inclusive. The vertical member 122c and 122e could include vertical surfaces 122p and 122q, respectively, which are substantially-planar to one another, vertical surface 122n and vertical surface 122o.

Horizontal member 122a could include three channels. A first channel defined by ends 122u and 122v may be a depression running the length of side 122r that is formed below and between lower surfaces 122f and 122g, lower surfaces 122h and 122i, and lower surfaces 122j and 122k. A second channel defined by ends 122w and 122x may be a depression running the length of side 122s that is formed, in part, below and between lower surfaces 122f and 122h and lower surfaces 122g and 122i. A third channel defined by ends 122y and 122z may be a depression running the length of side 122t that is formed, in part, below and between lower surfaces 122h and 122j and lower surfaces 122i and 122k. Each of the channel depressions could be, for example, rounded channels located and designed with a contour designed to support one or more cables when cable holder assembly 120 is clamped to module frame 108.

When cable holder assembly 120 is applied to module frame 108 in the first orientation, cables 102 are placed within first channel 122u-122v during the tightening of fastener 123 and lower corner 108g of module frame 108 is placed against the intersections of lower surface 122g and vertical surface 122n forming a first corner; lower surface 122i and vertical surface 122p forming a second corner; lower surface 122i and vertical surface 122q forming a third corner; and lower surface 122k and vertical surface 122o forming a fourth corner until lower member 108e of module frame 108 engages lower surfaces 122f through 122k, inclusive, of horizontal member 122a with a suitable amount of clamping force to enclose cables 102 within an enclosure formed by first channel 122u-122v and lower member 108e of module frame 108.

When cable holder assembly 120 is applied to module frame 108 in the second orientation, one or both cables 104 are placed within second channel 122w-122x and/or third channel 122y-122z during the tightening of fastener 123 and lower corner 108g of module frame 108 is placed against the four corners of the preceding paragraph until lower member 108e of module frame 108 engages lower surfaces 122f through 122k, inclusive, of horizontal member 122a with a suitable amount of clamping force to enclose cables 104 within enclosures formed between second channel 122w-122x and/or third channel 122y-122z and lower member 108e of module frame 108.

Figure 2:
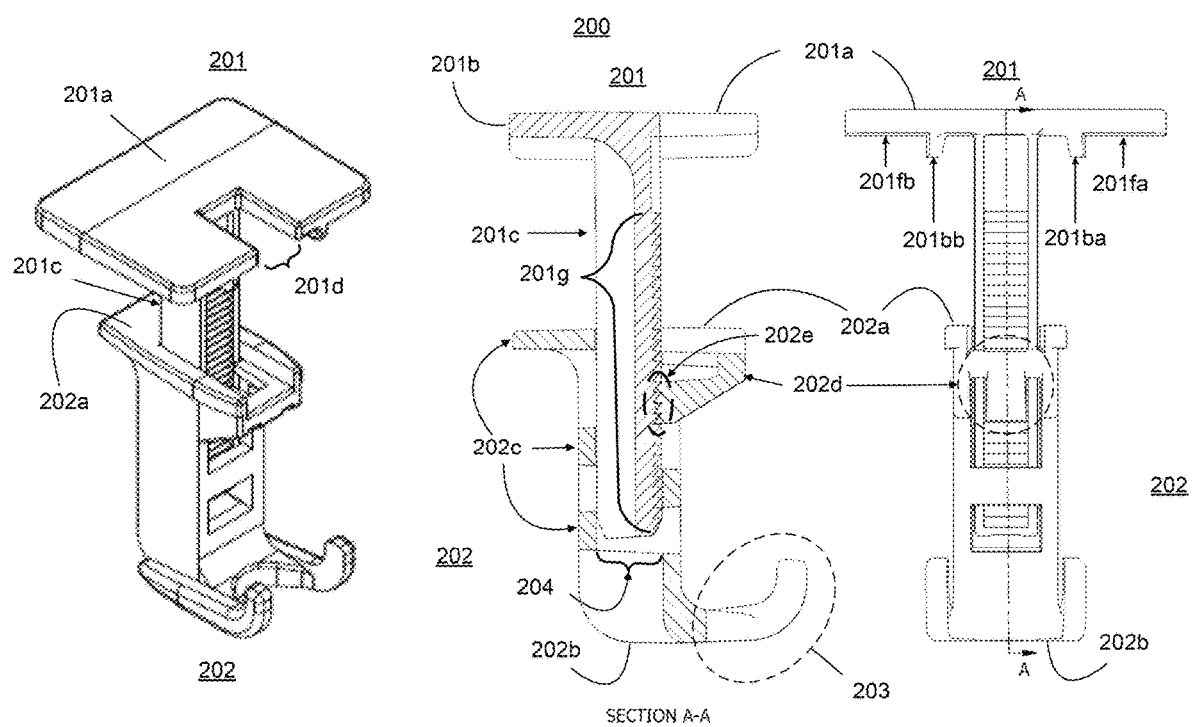
FIG. 2 illustrates one perspective view and two side views of a second cable holder assembly, in accordance with some embodiments.

FIG. 2 illustrates one perspective view and two side views of a second cable holder assembly 200 for placing a cable holder between adjacent module frames 108a and 108b (FIG. 10B) to facilitate a running for one or more electrical cables 102/104 (FIG. 1A) within an array or grouping of solar modules. Cable holder assembly 200 may include plunger 201 and base 202.

Plunger 201 could include cap 201a, stops 201ba and 201bb, vertical leg 201c, and gap 201d. Cap 201a includes lower surfaces 201fa and 201fb outward of stops 201ba and 201bb, respectively. Vertical leg 201c extends away from cap 201a in a substantially perpendicular direction. Gap 201d is designed for an insertion of a plunger-disengagement tool through which a downward force may be applied to pawl 202d, allowing for an extraction of plunger 201 from base 202. Lower surfaces 201fa and 201fb are designed to engage each upper member 108c of module frames 108a and 108b when cable holder assembly 200 is placed between module frames 108a and 108b. Stops 201ba and 201bb extend away from cap 201a in a substantially perpendicular direction and are designed for placement between module frames 108a and 108b. In some embodiments, stops 201ba and 201bb are configured to frictionally engage sides of module frames 108a and 108b.

A portion of vertical leg 201c includes rack 201g having teeth adapted to fall into notches or spaces formed by complementary teeth of pawl 202d to form ratchet 202e for permitting motion or mobility of plunger 201 in only one direction. In some embodiments, the teeth form a sawtooth surface having numerous diagonals surfaces between horizontal surfaces that are substantially parallel to cap 201a to engage a complementary sawtooth surface of pawl 202d.

Base 202 could be defined with upper side 202a, lower side 202b, outer side 202c, and pawl 202d, the latter having teeth adapted to fall into notches or spaces formed by complementary teeth of rack 201g. When engaged with each other, pawl 202d and a complementary portion of rack 201g form ratchet 202e for permitting motion in only one direction, i.e., an insertion of plunger 201 into base 202. To enable motion in the opposite direction, a plunger-disengagement tool may be inserted into gap 201d to engage pawl 202. As a downward force is applied to the tool, pawl 202d is forced away from rack 201g, allowing for extraction of plunger 201 from base 202.

Base 202 could include hook 203 and receptacle 204 designed to accept an insertion of vertical leg 201c of plunger 201. Receptacle 204 is located in between of outer side 202c and hook 203. In some embodiments, receptacle 204 could be defined with a rectangular opening extending between and substantially perpendicular to upper side 202a and lower side 202b.

When cable holder assembly 200 is placed between module frames 108a and 108b, plunger 201 is inserted into receptacle 204 while lower surfaces 201fa and 201fb of cap 201a are placed on each upper surface 108a of module frames 108a and 108b; during the insertion, stops 201ba and 201bb and upper side 202a of base 202 are held in position between module frames 108a and 108b. As plunger 201 is being inserted, pawl 202d contacts complementary teeth of a portion of rack 201g as rack 201g begins to pass by until the insertion is stopped when hook 203 reaches its desired position to receive and support one or more electrical cables.

Figure 3A:
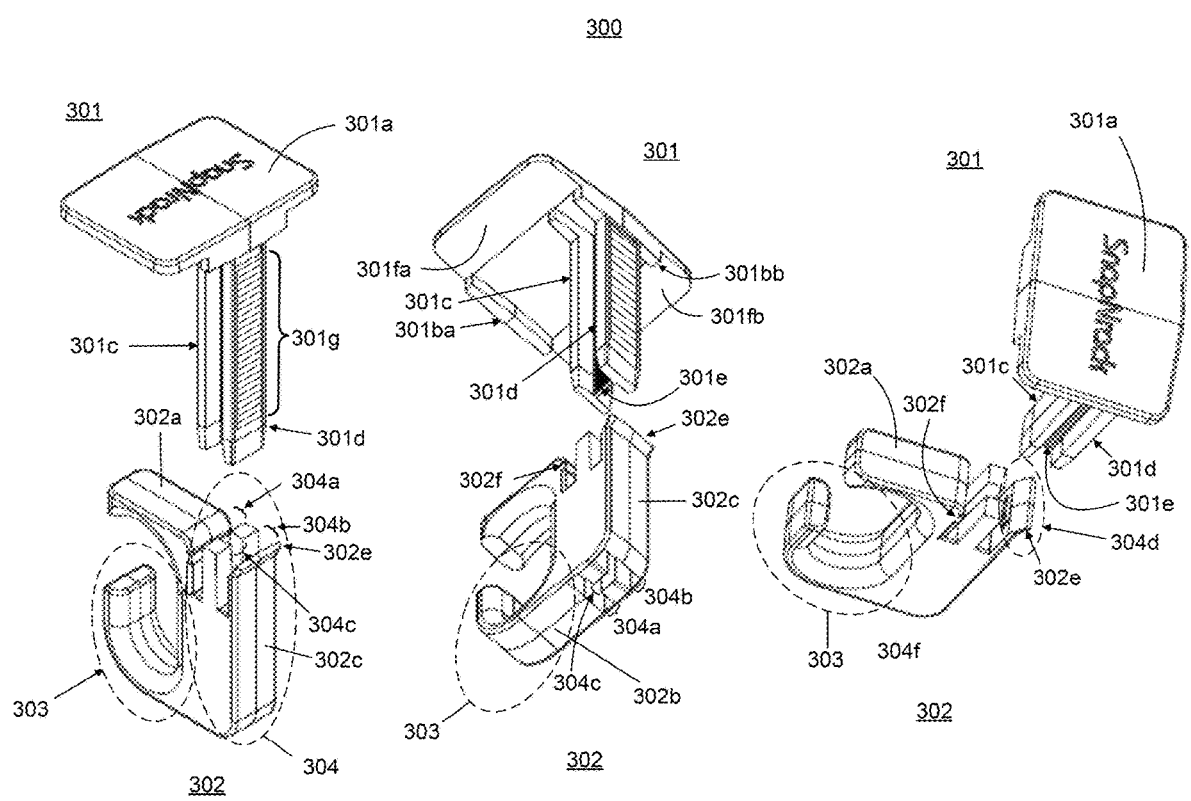
FIG. 3A illustrates three perspective views of a third cable holder assembly, in accordance with some embodiments.
Figure 3B:
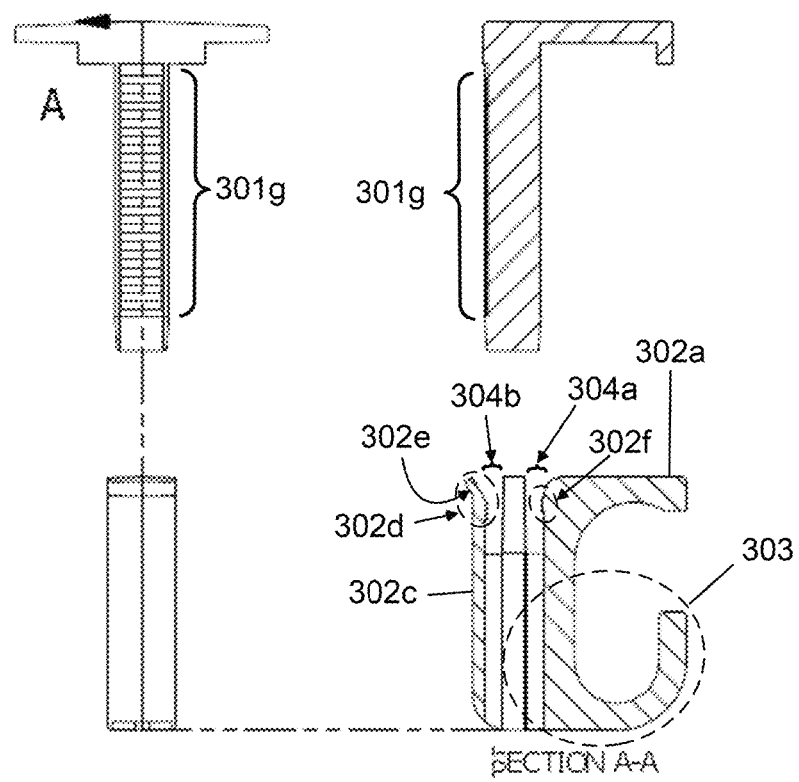
FIG. 3B illustrates two side views of the third cable holder assembly, in accordance with some embodiments.

FIGS. 3A and 3B illustrate three perspective views and two side views of third cable holder assembly 300 for placement between adjacent module frames 108a and 108b to facilitate a running for one or more electrical cables 102/104 within an array or grouping of solar modules. Cable holder assembly 300 may include plunger 301 and base 302.

Plunger 301 could include cap 301a, stops 301ba and 301bb, and a leg component which includes inner vertical leg 301c, outer vertical leg 301d, and intersecting vertical leg 301e. Cap 301a includes lower surfaces 301fa and 301fb outward of stops 301ba and 301bb. Stops 301ba and 301bb extend away from cap 301a in a substantially perpendicular direction and are designed for placement between module frames 108a and 108b. In some embodiments, stops 301ba and 301bb are configured to fictionally engage sides of module frames 108a and 108b when placed between module frames 108a and 108b.

Inner vertical leg 301c, outer vertical leg 301d, and intersecting vertical leg 301e form a generally H-shaped member extending away from cap 301a in a substantially perpendicular direction and substantially parallel to stops 301ba and 301bb. Inner and outer vertical legs 301c and 301d may run substantially parallel to one another and substantially perpendicular to vertical leg 301e that extends in between inner and outer vertical legs 301c and 301d.

A portion of an outer surface of outer vertical leg 301d includes rack 301g having teeth adapted to fall into notches or spaces formed by complementary teeth of pawl 302d that form a ratchet when engaged with each other (not shown) for permitting motion or mobility of plunger 301 in only one direction. In some embodiments, the teeth form a sawtooth surface having numerous diagonals surfaces between horizontal surfaces that are substantially parallel to cap 301a to engage a complementary sawtooth surface of pawl 302d.

Base 302 could be defined with upper side 302a configured with ridge 302f, lower side 302b, and outer side 302c configured with pawl 302d, the latter having teeth adapted to fall into notches or spaces formed by complementary teeth of rack 301g. Pawl 302d and a complementary portion of rack 301g form a ratchet when engaged with each other (not shown) for permitting motion in only one direction, i.e., an insertion of plunger 301 into base 302. To enable motion in the opposite direction, pawl 302d includes tab 302e extending outwardly from outer side 302c. A force applied to tab 302e from above moves pawl 302d away from rack 301g, allowing for extraction of plunger 301 from base 302.

Base 302 could include hook 303 and H-shaped receptacle 304 designed to accept an insertion of vertical legs 301c, 301d, and 301e. Receptacle 304 is located outward of upper side 302a and hook 303. Receptacle 304 is defined by a substantially H-shaped cross-section and includes three openings 304a, 304b, and 304c extending between and substantially perpendicular to upper side 302a and lower side 302b. As shown, ridge 302f protrudes into opening 304a, and teeth of pawl 302d protrude into opening 304b. When plunger 301 is inserted into base 302, a pinching force is imparted on both inner vertical leg 301c and outer vertical leg 301d between ridge 302f and the teeth of pawl 302d.

When cable holder assembly 300 is placed between module frames 108a and 108b, plunger 301 is inserted into receptacle 304 while lower surfaces 301fa and 301fb of cap 301a are placed above each upper surface 108c of module frames 108a and 108b; during the insertion, stops 301ba and 301bb and upper side 302a of base 302 are held in position between module frames 108a and 108b. As plunger 301 is being inserted, pawl 302d contacts complementary teeth of a portion of rack 301g as rack 301g begins to pass by until the insertion is stopped when hook 303 reaches its desired position to receive and support one or more electrical cables.

Figure 4A:
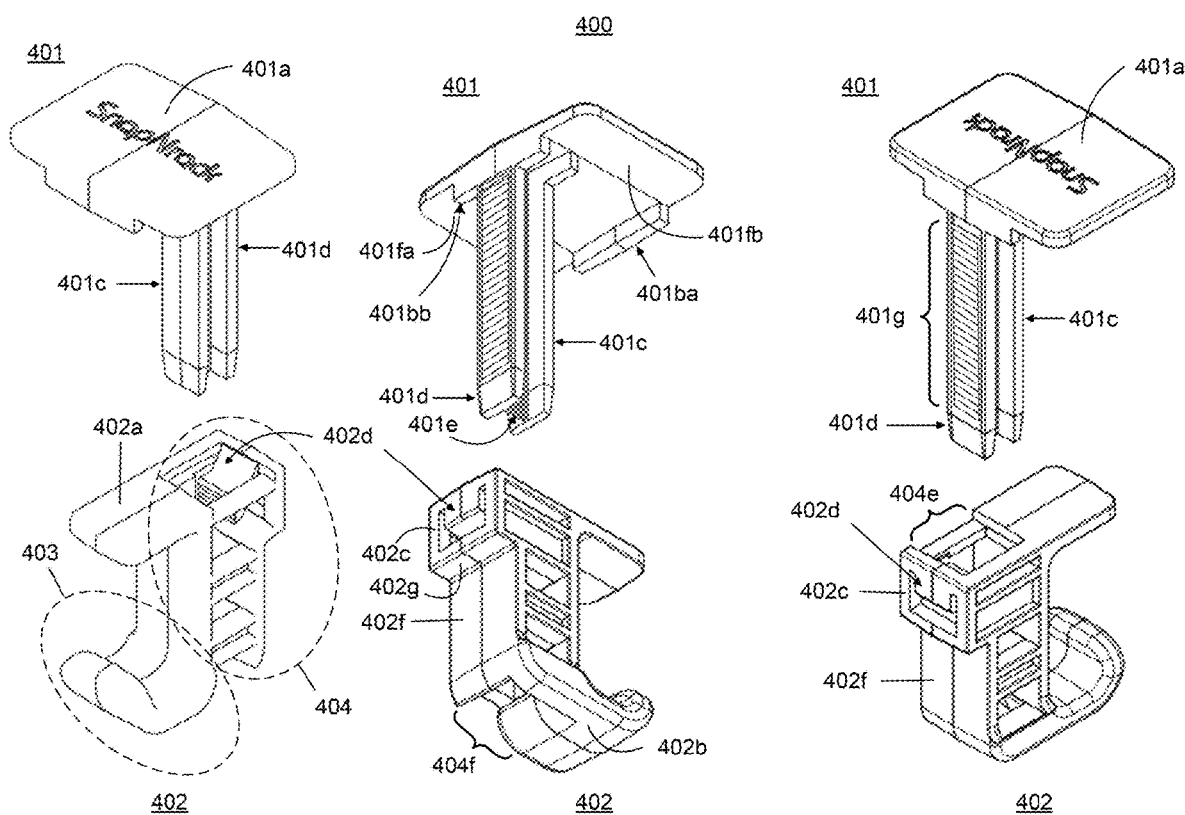
FIG. 4A illustrates three perspective views of a fourth cable holder assembly, in accordance with some embodiments.
Figure 4B:
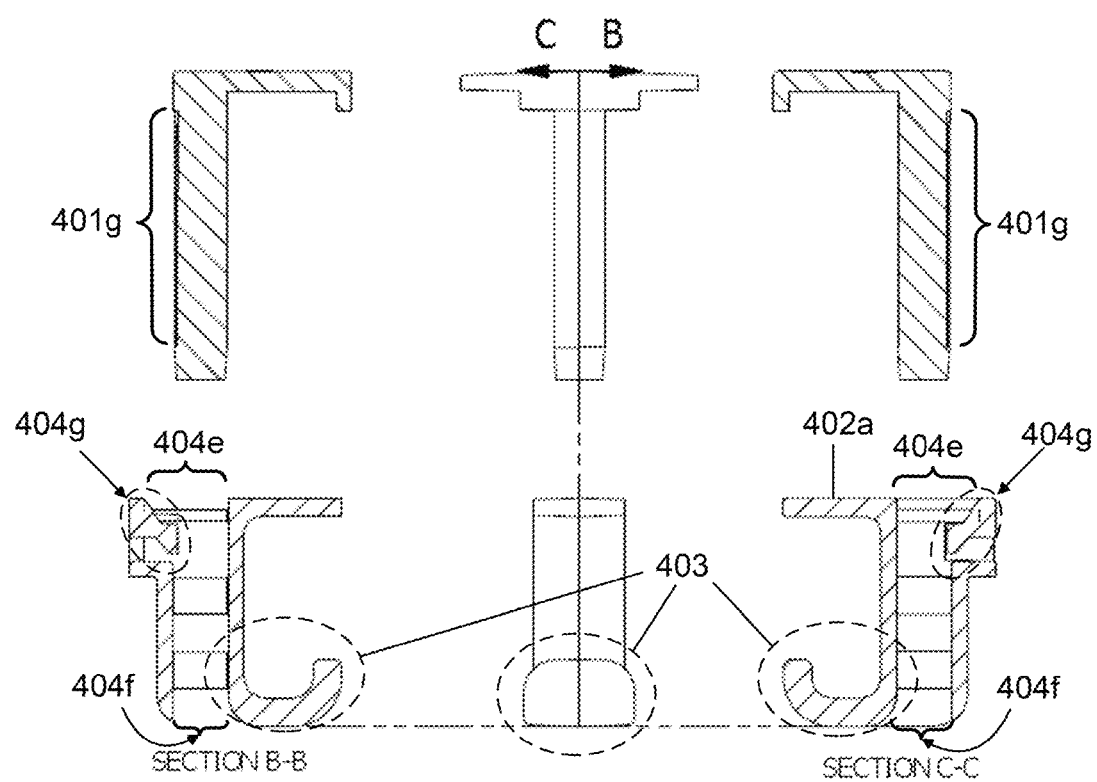
FIG. 4B illustrates three side views of the fourth cable holder assembly, in accordance with some embodiments.

FIGS. 4A and 4B illustrate three perspective views and three side views of fourth cable holder assembly 400 for placement between adjacent module frames 108a and 108b to facilitate a running for one or more electrical cables 102/104 within an array or grouping of solar modules. Cable holder assembly 400 may include plunger 401 and base 402.

Plunger 401 could include cap 401a, stops 401ba and 401bb, and a leg component which includes inner vertical leg 401c, outer vertical leg 401d, and intersecting vertical leg 401e. Cap 401a includes lower surfaces 401fa and 401fb outward of stops 401ba and 401bb. Stops 401ba and 401bb extend away from cap 401a in a substantially perpendicular direction and are designed for placement between module frames 108a and 108b. In some embodiments, stops 401ba and 401bb are configured to fictionally engage sides of module frames 108a and 108b when placed between module frames 108a and 108b.

Inner vertical leg 401c, outer vertical leg 401d, and intersecting vertical leg 401e form a generally H-shaped member extending away from cap 401a in a substantially perpendicular direction and substantially parallel to stops 401ba and 401bb. Inner and outer vertical legs 401c and 401d may run substantially parallel to one another and substantially perpendicular to vertical leg 401e that extends in between inner and outer vertical legs 401c and 401d.

A portion of an outer surface of outer vertical leg 401d includes rack 401g having teeth adapted to fall into notches or spaces formed by complementary teeth of pawl 402d that form a ratchet when engaged with each other (not shown) for permitting motion or mobility of plunger 401 in only one direction. In some embodiments, the teeth form a sawtooth surface having numerous diagonals surfaces between horizontal surfaces that are substantially parallel to cap 401a to engage a complementary sawtooth surface of pawl 402d.

Base 402 could be defined with upper side 402a configured with ridge 402f, lower side 402b, upper outer side 402c, and lower outer side 402f separated from upper outer side 402c by horizontal surface 402g substantially perpendicular to both. Upper outer side 402c may be configured with pawl 402d having teeth adapted to fall into notches or spaces formed by complementary teeth of rack 401g. When engaged with each other (not shown), pawl 402d and a complementary portion of rack 401g form a ratchet for permitting motion in only one direction, i.e., an insertion of plunger 401 into base 402. To enable motion in the opposite direction, a force applied to pawl 402d from above moves pawl 402d away from rack 401g, allowing for a disengagement of pawl 402d from a complementary portion of rack 401g and an extraction of plunger 401 from base 402.

Base 402 could include hook 403 and tiered receptacle 404 having upper receptacle with an upper opening 404e and a contiguous, lower receptacle with a lower opening 404f. Receptacle 404 is located inward of upper and lower outer sides 402c and 402f, and outward of hook 403. Lower opening 404f is narrower than upper opening 404e so that the lower receptacle accommodates an insertion of vertical legs 401c, 401d, and 401e, and upper opening 404e is wider so that the upper receptacle accommodates not only an insertion of vertical legs 401c, 401d, and 401e but also an inward protrusion of pawl 402d into the upper receptacle as well as an insertion of a plunger-disengagement tool for disengaging pawl 402d from a complementary portion of rack 401g when plunger 401 is extracted from base 402; pawl 402d extends inwardly or protrudes into the upper receptacle to a location that facilitates both the engagement and disengagement actions.

When cable holder assembly 400 is placed between module frames 108a and 108b, plunger 401 is inserted into receptacle 404 while lower surfaces 401fa and 401fb of cap 401a are placed above each upper surface 108c of module frames 108a and 108b; during the insertion, stops 401ba and 401bb and upper side 402a of base 402 are held in position between module frames 108a and 108b. As plunger 401 is being inserted, pawl 402d contacts complementary teeth of a portion of rack 401g as rack 401g begins to pass by until the insertion is stopped when hook 403 reaches its desired position to receive and support one or more electrical cables.

Figure 5A:
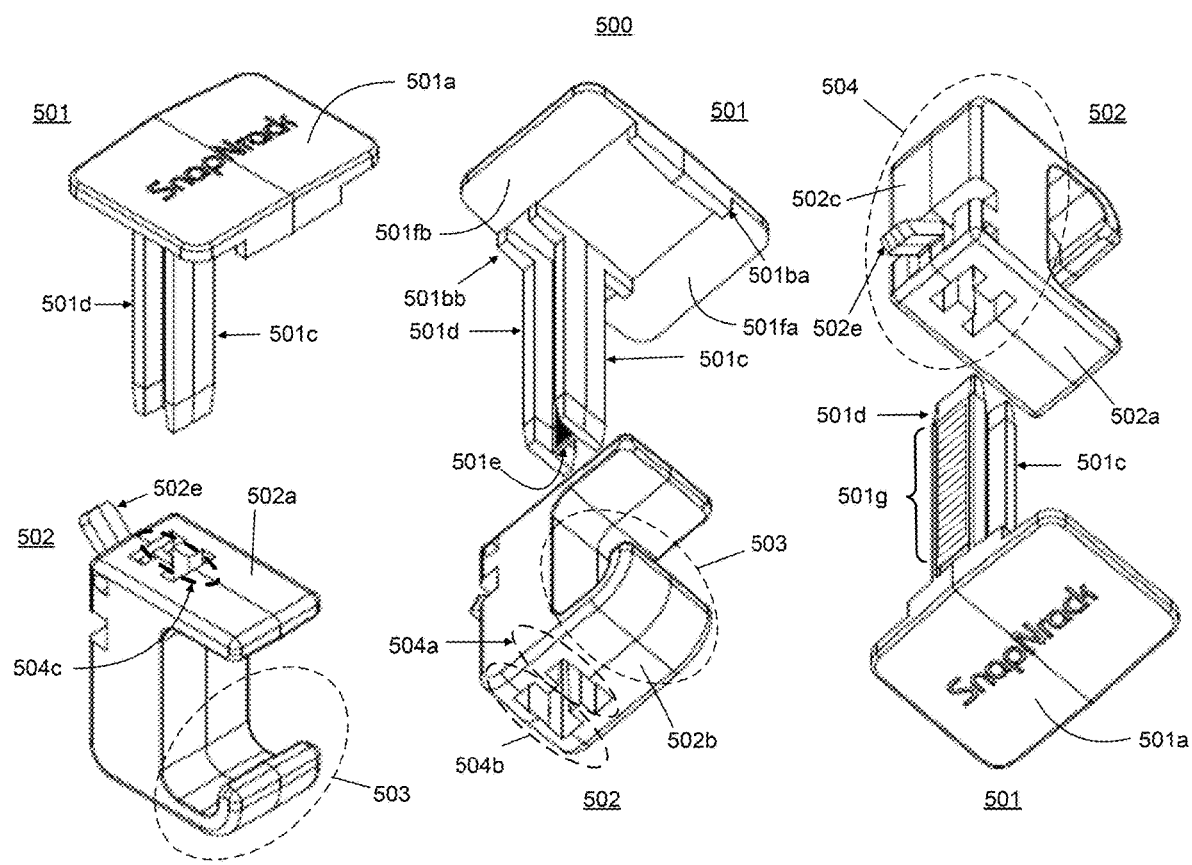
FIG. 5A illustrates three perspective views of a fifth cable holder assembly, in accordance with some embodiments.
Figure 5B:
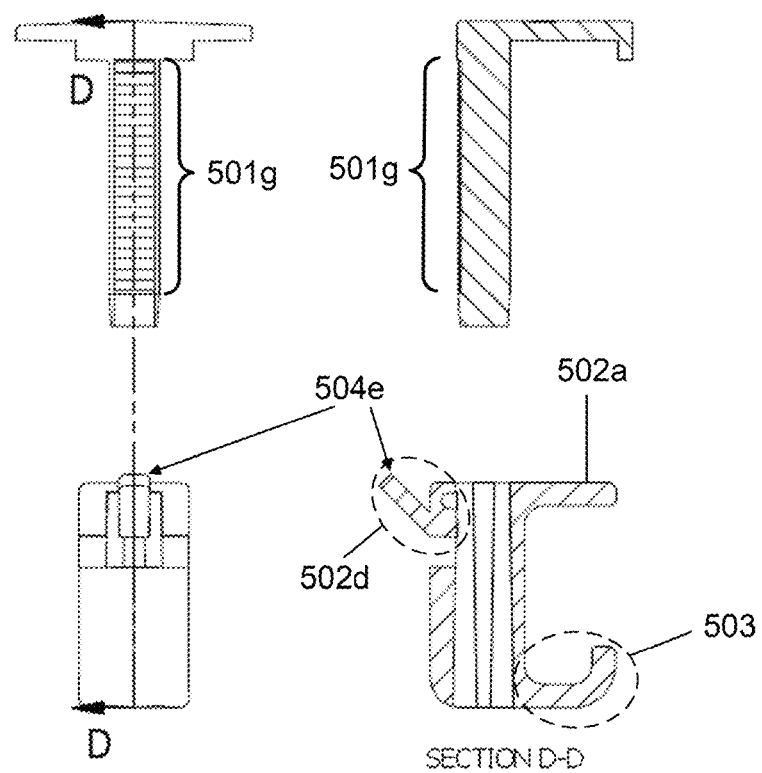
FIG. 5B illustrates two side views of the fifth cable holder assembly, in accordance with some embodiments.

FIGS. 5A and 5B illustrate three perspective views and two side views of fifth cable holder assembly 500 for placement between adjacent module frames 108a and 108b to facilitate a running for one or more electrical cables 102/104 within an array or grouping of solar modules. Cable holder assembly 500 may include plunger 501 and base 502.

Plunger 501 could include cap 501a, stops 501ba and 501bb, and a leg component which includes inner vertical leg 301c, outer vertical leg 301d, and intersecting vertical leg 301e. Cap 301a includes lower surfaces 501fa and 501fb outward of stops 501ba and 501bb. Stops 501ba and 501bb extend away from cap 301a in a substantially perpendicular direction and are designed for placement between module frames 108a and 108b. In some embodiments, stops 501ba and 501bb are configured to fictionally engage sides of module frames 108a and 108b when placed between module frames 108a and 108b.

Inner vertical leg 501c, outer vertical leg 501d, and intersecting vertical leg 501e form a generally H-shaped member extending away from cap 501a in a substantially perpendicular direction and substantially parallel to stops 501ba and 501bb. Inner and outer vertical legs 501c and 501d may run substantially parallel to one another and substantially perpendicular to vertical leg 501e that extends in between inner and outer vertical legs 501c and 501d.

A portion of an outer surface of outer vertical leg 501d includes rack 501g having teeth adapted to fall into notches or spaces formed by complementary teeth of pawl 502d that form a ratchet when engaged with each other (not shown) for permitting motion or mobility of plunger 501 in only one direction. In some embodiments, the teeth form a sawtooth surface having numerous diagonals surfaces between horizontal surfaces that are substantially parallel to cap 501a to engage a complementary sawtooth surface of pawl 502d.

Base 502 could be defined with upper side 502a, lower side 502b, and outer side 502c configured with pawl 502d, the latter having teeth adapted to fall into notches or spaces formed by complementary teeth of rack 501g. Pawl 502d and a complementary portion of rack 501g form a ratchet when engaged with each other (not shown) for permitting motion in only one direction, i.e., an insertion of plunger 501 into base 502. To enable motion in the opposite direction, pawl 502d includes tab 502e extending outwardly from outer side 502c. A generally upward force applied to tab 502e moves pawl 502d away from rack 501g, allowing for extraction of plunger 501 from base 502.

Base 502 could include hook 503 and H-shaped receptacle 504 designed to accept an insertion of vertical legs 501c, 501d, and 501e. Receptacle 504 is located inward of outer side 502c and outward of hook 503. Receptacle 504 is defined by a substantially H-shaped cross-section and includes three openings 504a, 504b, and 504c extending between and substantially perpendicular to upper side 502a and lower side 502b. In some embodiments, a ridge (e.g., ridge 302f of FIG. 3A) may protrude into opening 504a, and teeth of pawl 502d protrude into opening 504b. When plunger 501 is inserted into base 502, a pinching force is imparted on both inner vertical leg 501c and outer vertical leg 501d between the ridge and the teeth of pawl 502d.

When cable holder assembly 500 is applied to module frame 108, plunger 501 is inserted into receptacle 504 while lower surfaces 501fa and 501fb of cap 501a are placed above each upper surface 108c of module frames 108a and 108b; during the insertion, stops 501ba and 501bb and upper side 502a of base 502 are held in position between module frames 108a and 108b. As plunger 501 is being inserted, pawl 502d contacts complementary teeth of a portion of rack 501g as rack 501g begins to pass by until the insertion is stopped when hook 503 reaches its desired position to receive and support one or more electrical cables.

Figure 6A:
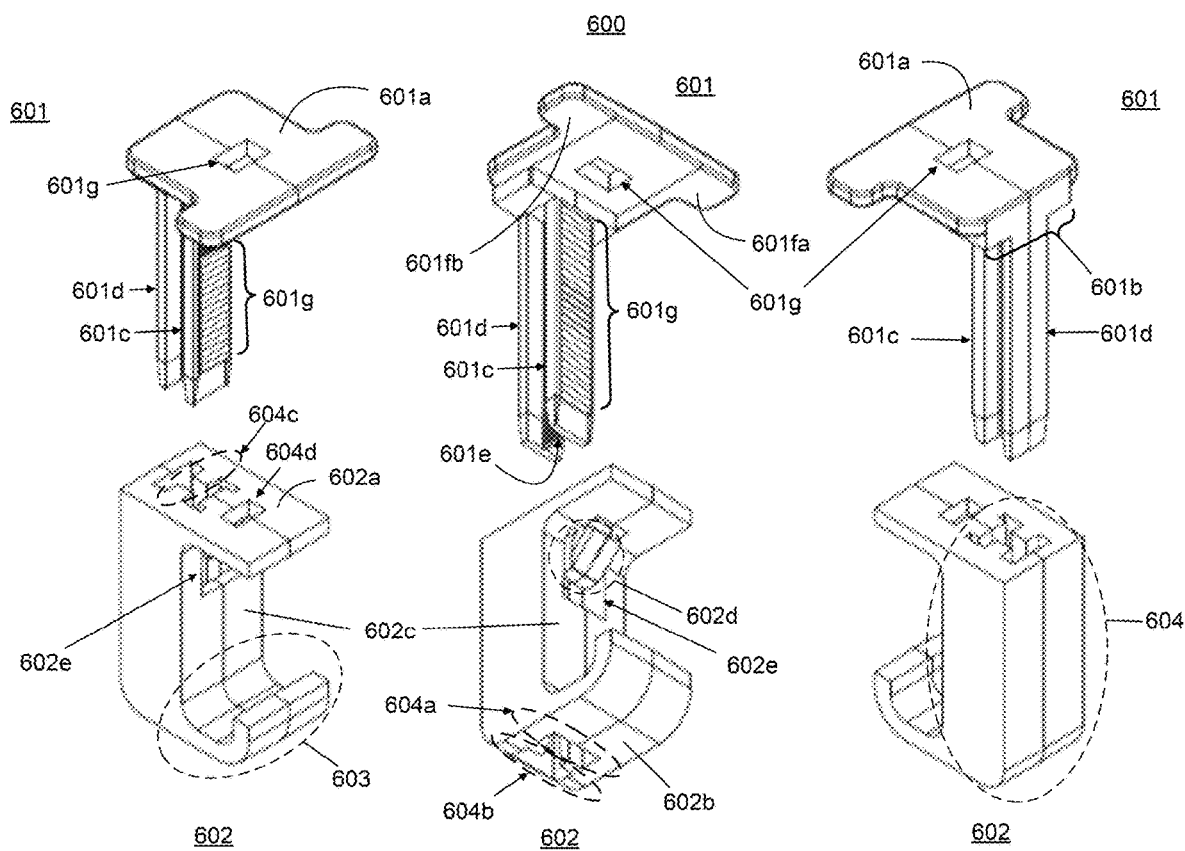
FIG. 6A illustrates three perspective views of a sixth cable holder assembly, in accordance with some embodiments.
Figure 6B:
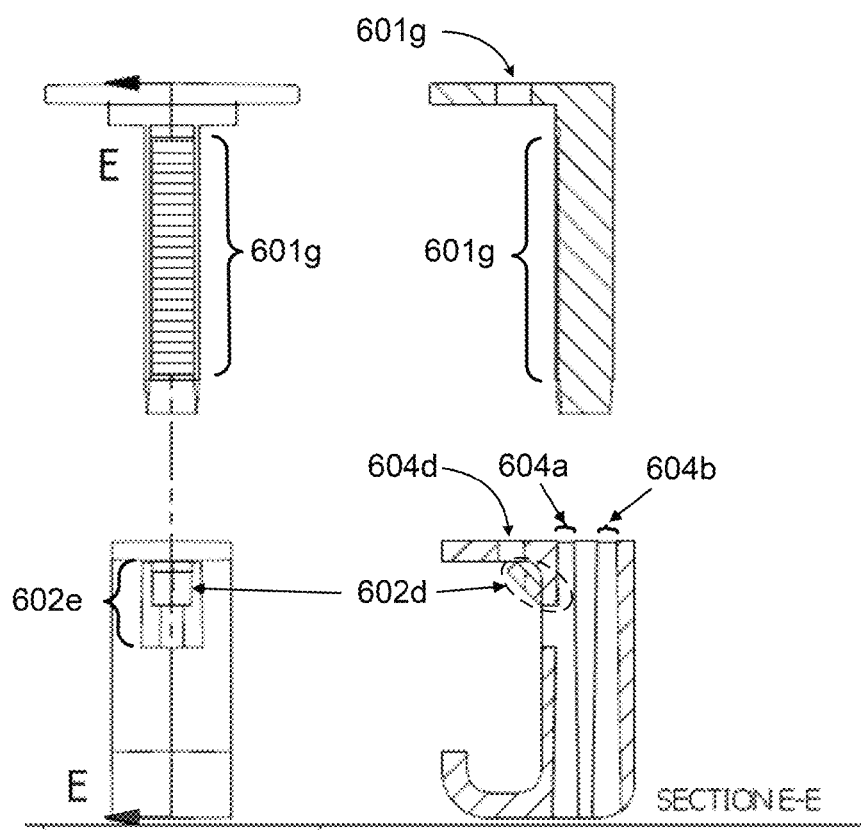
FIG. 6B illustrates two side views of the sixth cable holder assembly, in accordance with some embodiments.

FIGS. 6A and 6B illustrate three perspective views and two side views of sixth cable holder assembly 600 for placement between adjacent module frames 108a and 108b to facilitate a running for one or more electrical cables 102/104 within an array or grouping of solar modules. Cable holder assembly 600 may include plunger 601 and base 602.

Plunger 601 could include cap 601a, stop 601b, a leg component which includes inner vertical leg 601c, outer vertical leg 601d, intersecting vertical leg 601e, and aperture 601g. Cap 601a includes lower surfaces 601fa and 601fb outward of stop 601b. Stop 601b extends away from cap 601a in a substantially perpendicular direction and is designed for placement between module frames 108a and 108b. In some embodiments, stop 601b is configured to fictionally engage sides of module frames 108a and 108b when placed between module frames 108a and 108b.

Inner vertical leg 601c, outer vertical leg 601d, and intersecting vertical leg 601e form a generally H-shaped member extending away from cap 601a in a substantially perpendicular direction. Inner and outer vertical legs 601c and 601d may run substantially parallel to one another and substantially perpendicular to vertical leg 601e that extends in between inner and outer vertical legs 601c and 601d.

A portion of an inner surface of inner vertical leg 601c includes rack 601g having teeth adapted to fall into notches or spaces formed by complementary teeth of pawl 602d that form a ratchet when engaged with each other (not shown) for permitting motion or mobility of plunger 601 in only one direction. In some embodiments, the teeth form a sawtooth surface having numerous diagonals surfaces between horizontal surfaces that are substantially parallel to cap 601a to engage a complementary sawtooth surface of pawl 302d.

Base 602 could be defined with upper side 602a having aperture 604d, lower side 602b, and inner side 602c configured with pawl 602d and receptacle 602e. Pawl 602d extends through receptacle 602e and includes teeth adapted to fall into notches or spaces formed by complementary teeth of rack 601g; receptacle 602e may have a size that is sufficient enough to facilitate an insertion of a plunger-disengagement tool for disengaging pawl 602d from a complementary portion of rack 601g when plunger 601 is extracted from base 602. Pawl 602d and a complementary portion of rack 601g form a ratchet when engaged with each other (not shown) for permitting motion in only one direction, i.e., an insertion of plunger 601 into base 602. To enable motion in the opposite direction, an outward pulling force may be applied to pawl 602d to move it away from rack 601g and partially into aperture 604d, allowing for extraction of plunger 601 from base 602.

Base 602 could include hook 603 and H-shaped receptacle 604 designed to accept an insertion of vertical legs 601c, 601d, and 601e. Receptacle 604 is located outward of inner side 602c and hook 603. Receptacle 604 is defined by a substantially H-shaped cross-section and includes three openings 604a, 604b, and 604c extending between and substantially perpendicular to upper side 602a and lower side 602b. In some embodiments, a ridge (e.g., ridge 302f of FIG. 3A) may protrude into opening 604b, and teeth of pawl 602d protrude into opening 604a. When plunger 601 is inserted into base 602, a pinching force is imparted on both inner vertical leg 601c and outer vertical leg 601d between the ridge and the teeth of pawl 602d.

When cable holder assembly 600 is placed between module frames 108a and 108b, plunger 601 is inserted into receptacle 604 while lower surfaces 601fa and 601fb of cap 601a are placed above each upper surface 108c of module frames 108a and 108b; during the insertion, stop 601b and upper side 602a of base 602 are held in position between module frames 108a and 108b. As plunger 601 is being inserted, pawl 602d contacts complementary teeth of a portion of rack 601g as rack 601g begins to pass by until the insertion is stopped when hook 603 reaches its desired position to receive and support one or more electrical cables.

Figure 7A:
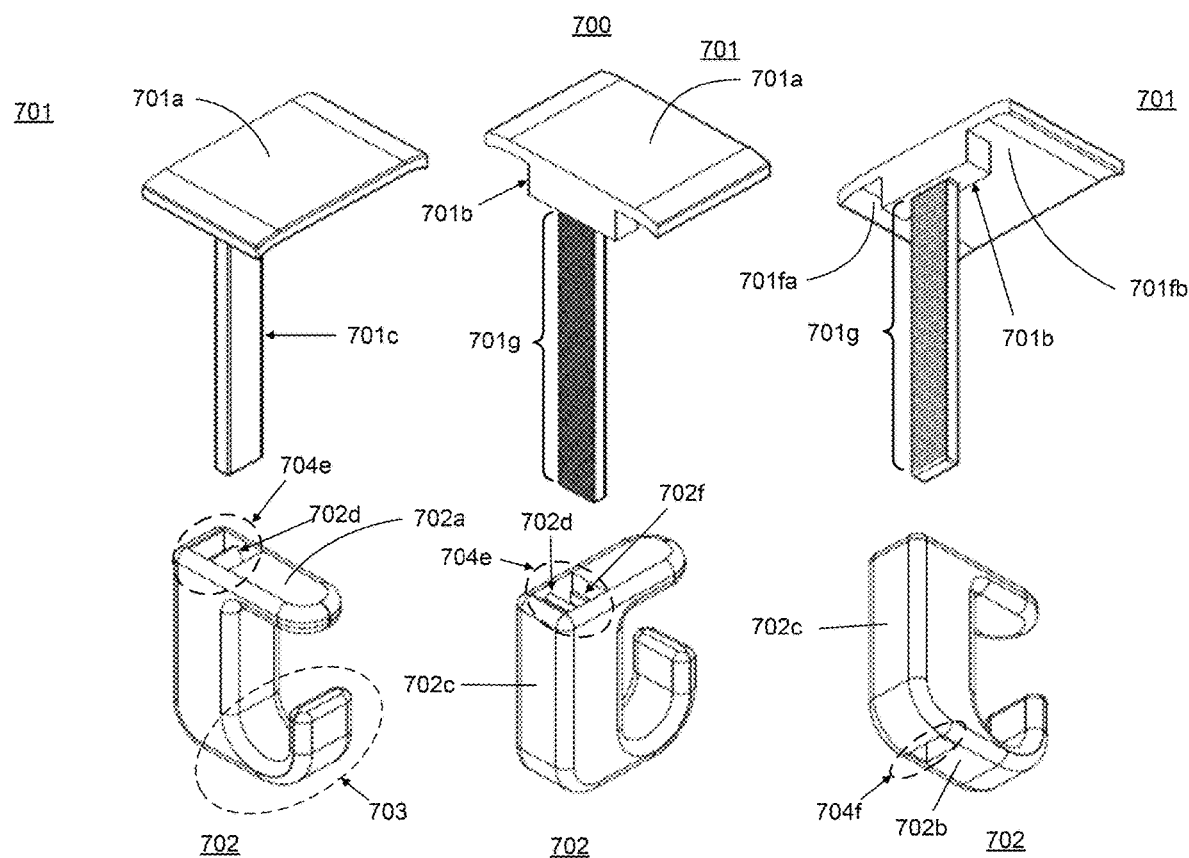
FIG. 7A illustrates three perspective views of a seventh cable holder assembly, in accordance with some embodiments.
Figure 7B:
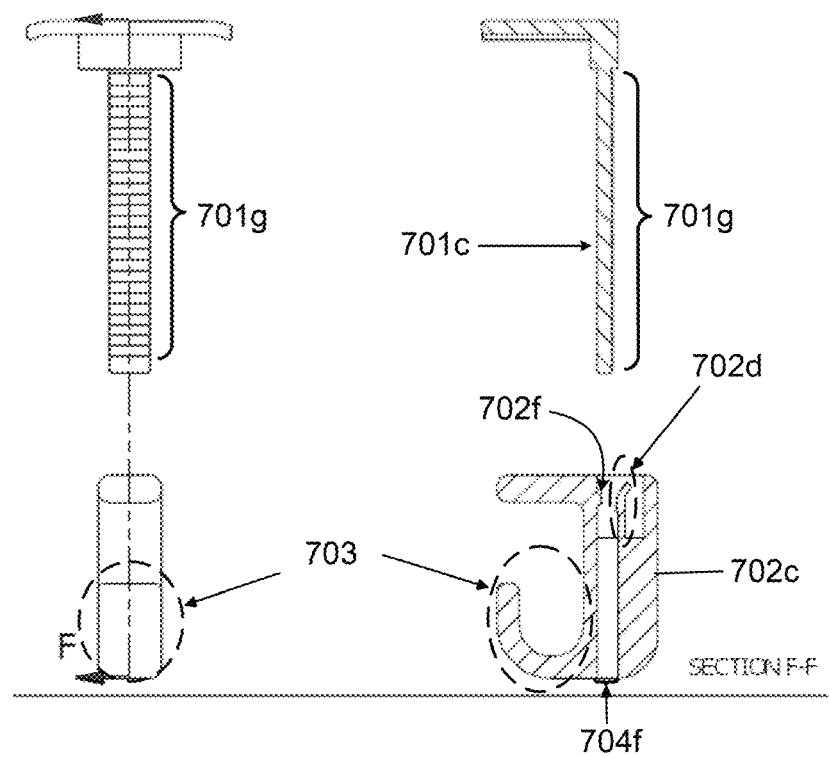
FIG. 7B illustrates two side views of the seventh cable holder assembly, in accordance with some embodiments.

FIGS. 7A and 7B illustrate three perspective views and two side views of seventh cable holder assembly 700 for placement between adjacent module frames 108a and 108b to facilitate a running for one or more electrical cables 102/104 within an array or grouping of solar modules. Cable holder assembly 700 may include plunger 701 and base 702.

Plunger 701 could include cap 701a, stop 701b, and a leg component which includes vertical leg 701c. Cap 701a includes lower surfaces 701fa and 701fb outward of stop 701b. Stops 701b extends away from cap 701a in a substantially perpendicular direction and are designed for placement between module frames 108a and 108b. In some embodiments, stop 701b is configured to fictionally engage sides of module frames 108a and 108b when placed between module frames 108a and 108b.

Vertical leg 701c is located in between stop 701b and extends away from lower surfaces 701fa and 701fb of cap 701a in a substantially perpendicular direction. One surface of vertical leg 701c includes rack 701g having teeth adapted to fall into notches or spaces formed by complementary teeth of pawl 702d that form a ratchet when engaged with each other (not shown) for permitting motion or mobility of plunger 701 in only one direction. In some embodiments, the teeth form a sawtooth surface having numerous diagonals surfaces between horizontal surfaces that are substantially parallel to cap 701a to engage a complementary sawtooth surface of pawl 702d.

Base 702 could be defined with upper side 702a configured with ridge 702f, lower side 402b, and outer side 402c. Base 702 could include hook 703 and tiered receptacle 704 having upper receptacle with an upper opening 704e and a contiguous, lower receptacle with a lower opening 704f. Receptacle 704 is located inward of outer side 702c and outward of hook 703. Lower opening 704f is narrower than upper opening 704e so that the lower receptacle accommodates an insertion of vertical leg 701c, and upper opening 704e is wider so that the upper receptacle accommodates not only an insertion of vertical leg 701c but also an insertion of a plunger-disengagement tool between pawl 702d and outer side 702c for disengaging pawl 702d from a complementary portion of rack 701g when plunger 701 is extracted from base 702.

Pawl 702d includes teeth adapted to fall into notches or spaces formed by complementary teeth of rack 701g. Pawl 702d and a complementary portion of rack 701g form a ratchet when engaged with each other (not shown) for permitting motion in only one direction, i.e., an insertion of plunger 701 into base 702. To enable motion in the opposite direction, pawl 702d includes tab 702e to which a downward force may be applied from above to move pawl 702d away from rack 701g, allowing for a disengagement of pawl 702d from a complementary portion of rack 701g and an extraction of plunger 701 from base 702. Also, ridge 702f and the teeth of pawl 702d protrude upper receptacle as shown. When plunger 701 is inserted into base 702, a pinching force is imparted on vertical leg 701c between ridge 702f and the teeth of pawl 702d.

When cable holder assembly 700 is placed between module frames 108a and 108b, plunger 701 is inserted into receptacle 704 while lower surfaces 701fa and 701fb of cap 701a are placed above each upper surface 708c of module frames 108a and 108b; during the insertion, stop 701b and upper side 702a of base 702 are held in position between module frames 108a and 108b. As plunger 701 is being inserted, pawl 702d contacts complementary teeth of a portion of rack 701g as rack 701g begins to pass by until the insertion is stopped when hook 703 reaches its desired position to receive and support one or more electrical cables.

Figure 8:
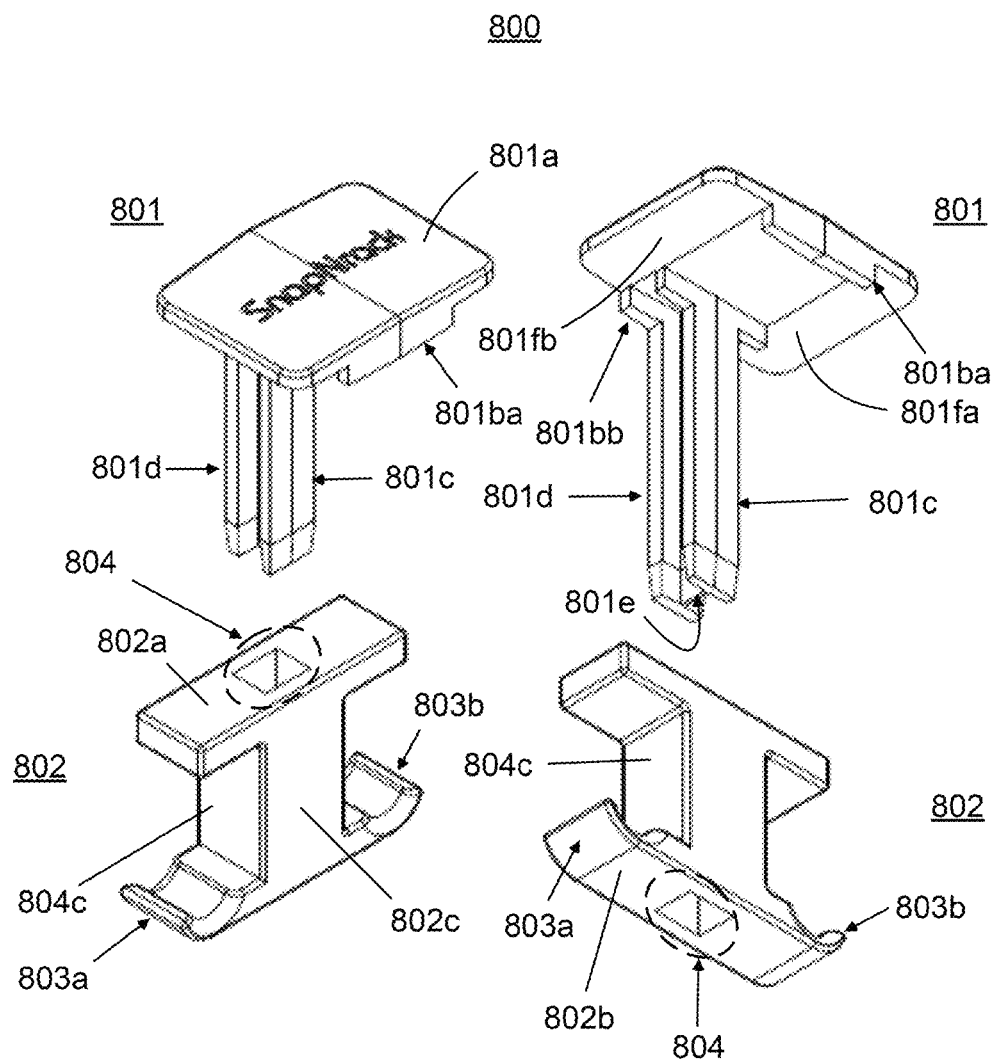
FIG. 8 illustrates four perspective views of eighth cable holder assembly, in accordance with some embodiments.

FIG. 8 illustrates four perspective views of eighth cable holder assembly 800 for placement between adjacent module frames 108a and 108b to facilitate a running for one or more electrical cables 102/104 within an array or grouping of solar modules. Cable holder assembly 800 may include plunger 801 and base 802.

Plunger 801 could include cap 801a, stops 801ba and 801bb, and a leg component which includes inner vertical leg 801c, outer vertical leg 801d, and intersecting vertical leg 801e. Cap 801a includes lower surfaces 801fa and 801fb in between stops 801ba and 801bb and inner vertical leg 801c. Stops 801ba and 801bb extend away from cap 801a in a substantially perpendicular direction and are designed for placement between module frames 108a and 108b. In some embodiments, stops 801ba and 801bb are configured to fictionally engage sides of module frames 108a and 108b when placed between module frames 108a and 108b.

Inner vertical leg 801c, outer vertical leg 801d, and intersecting vertical leg 801e form a generally H-shaped member extending away from cap 801a in a substantially perpendicular direction and substantially parallel to stops 801ba and 801bb. Inner and outer vertical legs 801c and 801d may run substantially parallel to one another and substantially perpendicular to vertical leg 801e that extends in between inner and outer vertical legs 801c and 801d.

Similar to the discussions presented above, a portion of an outer surface of outer vertical leg 801d could include a rack (not shown) having teeth adapted to fall into notches or spaces formed by complementary teeth of a pawl (not shown) that form a ratchet when engaged with each other (not shown) for permitting motion or mobility of plunger 801 in only one direction. In some embodiments, the teeth form a sawtooth surface having numerous diagonals surfaces between horizontal surfaces that are substantially parallel to cap 801a to engage a complementary sawtooth surface of the pawl.

Similar to the discussions presented above, base 802 could be defined with upper side 802a, lower side 802b, inner side 802c, and an outer side (not shown). Base 802 could include hooks 803a and 803b (i.e., cable holders) and receptacle 804 located in between inner side 802c and the outer side and designed to accept an insertion of vertical legs 801b, 801c, and 801d; it should be noted that, although not shown, receptacle 804 could be an H-shaped receptacle.

Base 802 could be defined with upper side 802a, lower side 802b, and outer side 802c. Base 802 could include hooks 803a and 803b, and receptacle 804 designed to accept an insertion of vertical legs 801c, 801d, and 801e. Receptacle 804 is located inward of hooks 803a and 803b.

When cable holder assembly 800 is placed between module frames 108a and 108b, plunger 801 is inserted into receptacle 804 while lower surfaces 801fa and 801fb of cap 801a are placed above each upper surface 108c of module frames 108a and 108b; during the insertion, stops 801ba and 801bb and upper side 802a of base 802 are held in position between module frames 108a and 108b. As plunger 801 is being inserted, pawl 802d contacts complementary teeth of a portion of rack 801g as rack 801g begins to pass by until the insertion is stopped when hook 803 reaches its desired position to receive and support one or more electrical cables.

Figure 9A:
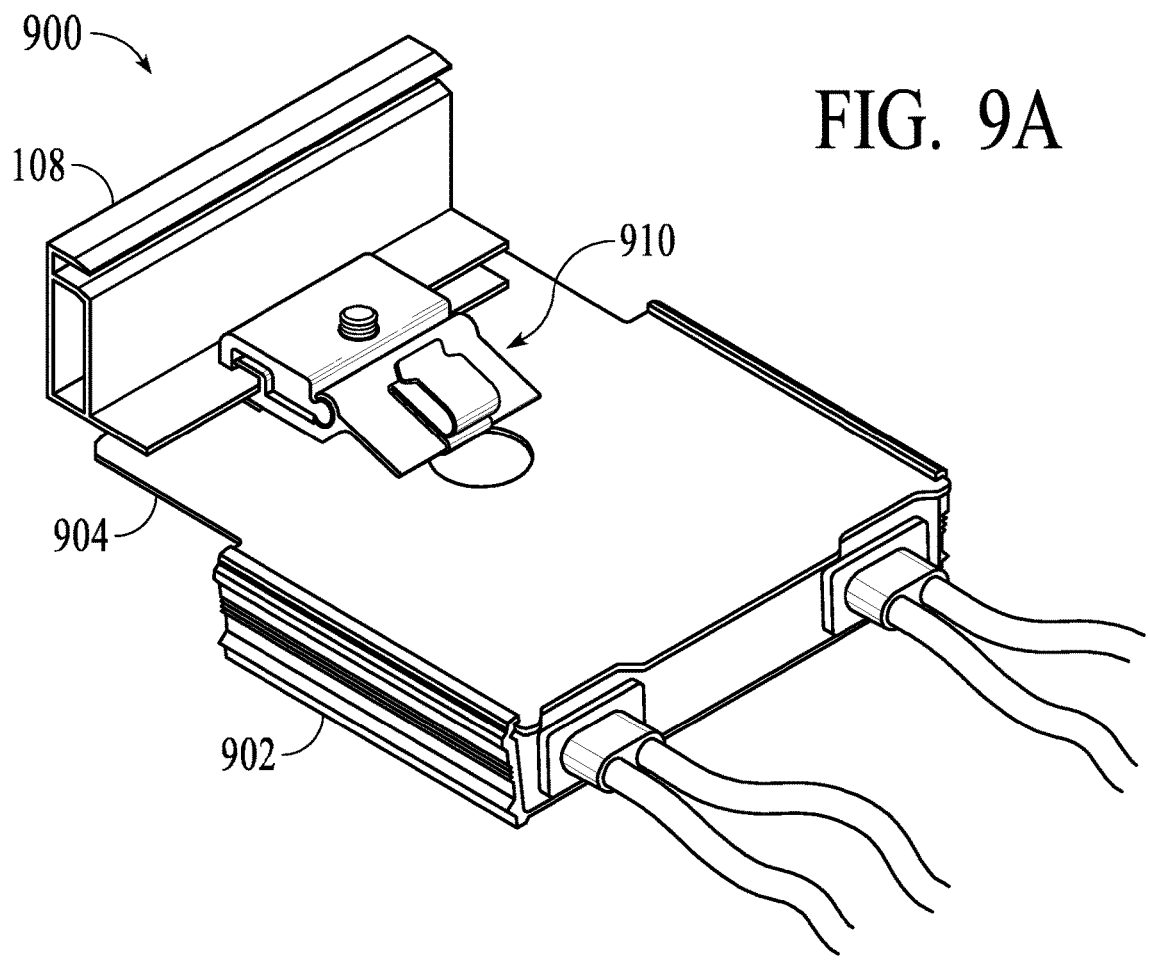
FIGS. 9A and 9B illustrate one perspective view and one side view of a solar component mounting system, in accordance with some embodiments.
Figure 9B:
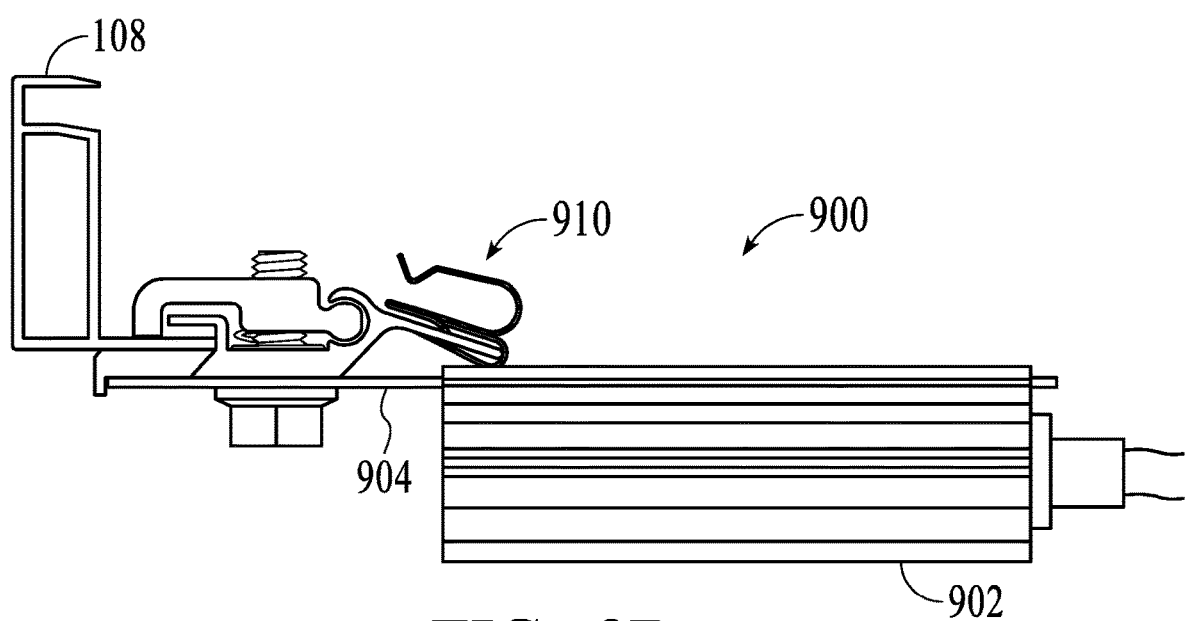
Figure 9C:
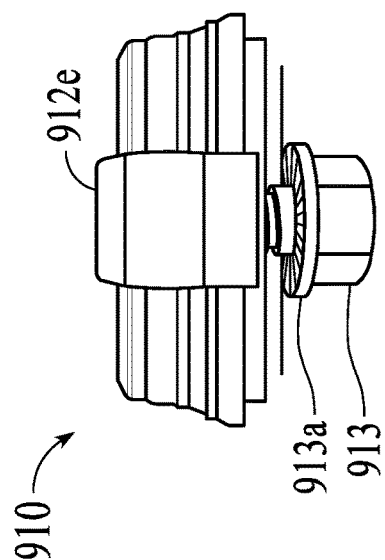
FIG. 9C through 9F illustrate one perspective view, one top view, and two side views of the solar component mounting system, in accordance with some embodiments.
Figure 9D:
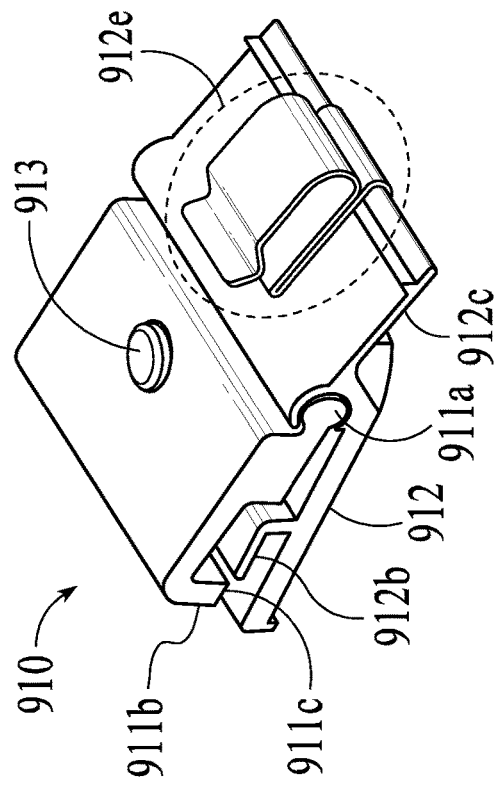
Figure 9E:
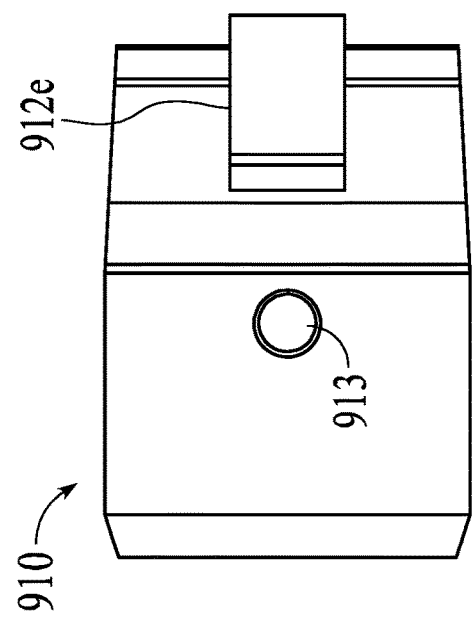
Figure 9F:
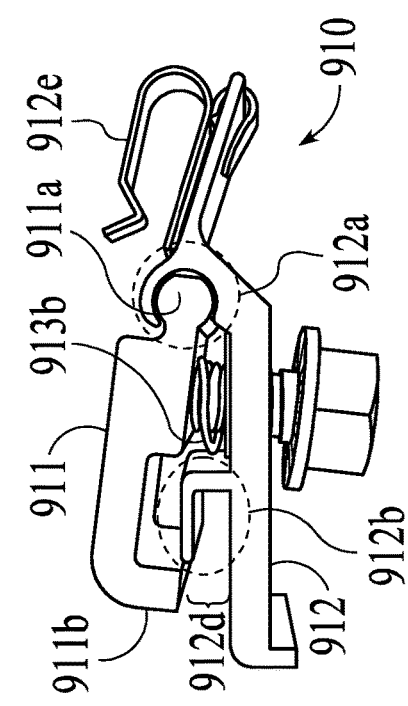

FIGS. 9A and 9B illustrates one perspective view and one side view, respectively, of solar component mounting system 900 in which a mount 910 may be coupled to solar module frame 108 of FIG. 1A to facilitate mounting of a solar component 902 affixed to an interface 904 (e.g., plate), where solar component 902 could be any component employed in an array or grouping of solar modules. In some embodiments, solar component 902 could be a Module Level Power Electronics (MLPE), typically an optimizer or microinverter product in a smallish enclosure.

FIGS. 9C through 9F illustrate one perspective view, one top view, and two side views, respectively, of mount 910 for facilitating the coupling of solar component 902 to solar module frame 108. Mount 910 could include upper body 911, lower body 912, and/or fastener 913.

Upper body 911 includes rounded pivoting end 911a, clamping end 911b having clamping surface 911c, and a threaded aperture through which a threaded portion of fastener 913 extends. Clamping end 911b extends downwardly and substantially perpendicular to upper body 911. Upper body 911 is designed to pivot around pivoting end 911a and move in a counter-clockwise direction when a tightening force is applied to fastener 913, drawing clamping surface 911c to move downwardly towards lower body 912.

Lower body 912 includes rounded pivoting end enclosure 912a, L-shaped member 912b, clamp attachment member 912c, and an aperture though which fastener 913 extends towards the treaded aperture of upper body 911. Pivoting end enclosure 912a is designed to provide an enclosure within which pivoting end 911a may pivot. L-shaped member 912b extends upwardly from lower body 912b to form slot 912d into which lower member 108e of module frame 108 may be slid when mount 910 is coupled to module frame 108. Clamp attachment member 912c extends substantially radially away from pivoting end enclosure 912a to provide a surface to which clip 912e may be engaged. When engaged, clip 912e may be used to secure cable(s) passing within the array or grouping of solar modules.

Fastener 913 could include lock washer 913a and spring 913b. In some embodiments, lock washer 913a may include serrations that engage a lower surface of plate 904. Spring 913b may be employed to pre-load solar component 902 to plate 904.

When mounting system 900 is employed, plate 904 to which solar component 902 is affixed may be placed against lower body 912 and fastener 913 may be inserted through plate 904 (configured with an aperture or a slot through which fastener 913 may extend) and the aperture of lower body 912 to engage the aperture of upper body 911. As a tightening force is applied, plate 904 is drawn towards lower body 912 until lock washer 913a engages lower body 912. Then, lower member 108e of module frame 108 may be slid into slot 912d. When the tightening force is further applied, clamping surface 911c is drawn downwardly towards lower body 912 until the desired amount of clamping force is applied to lower body 912 by upper body 911 through clamping surface 911c.

Figure 10A:
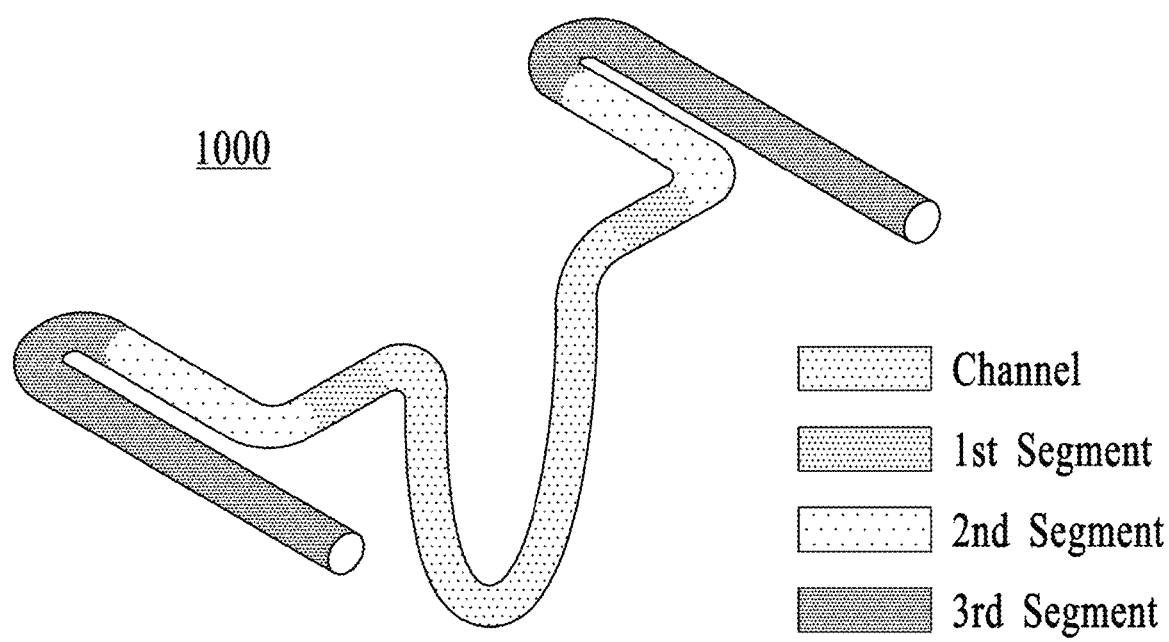
FIGS. 10A and 10B illustrate one perspective view and one side view of a wire formed into a wire hook, in accordance with some embodiments.
Figure 10B:
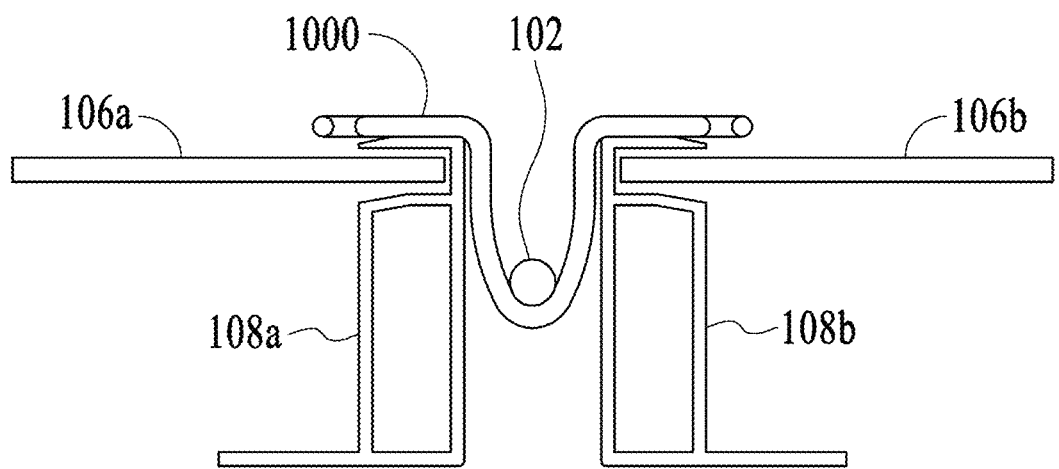

FIGS. 10A and 10B illustrate one perspective view and one side view of a member formed into cable or wire hook 1000 as shown. The cable hook 1000 is formed so that a pair of outer portions comprised of first, second, and third segments may be placed on top sides of the module frames 108 enclosing solar panels 106, as shown, while the middle of the cable hook 1000 forms a channel (e.g., a U-shape) that occupies a first plane and is placed between vertical sides of the adjacent module frames 108 using the pair of outer portions which occupy a second plane substantially perpendicular to the first plane and extending outward from ends of the channel.

As shown, a first segment extends in the same plane as the channel and outward from an end of the channel until reaching a first turn. Then, a second segment turns at the first turn and extends in a first direction substantially perpendicular to the first segment until reaching a second turn. Then, a third segment turns at the second turn and extends in a second direction substantially opposite to the first direction until reaching an end of the member. When this occurs, the cable hook 1000 has been placed into a position to support one or more electrical cables and facilitate a running of the cable(s) between the vertical sides of the adjacent module frames 108 as shown. In some embodiments, the second segments may turn in opposite directions (not shown).

As used herein, the term "embodiment" means an embodiment that serves to illustrate by way of example but not limitation. It should be understood that the aspects, features and advantages made apparent from the foregoing are efficiently attained and, since certain changes may be made in the disclosed inventive embodiments without departing from the spirit and scope of the invention, it is intended that all matter contained herein shall be interpreted as illustrative and not in a limiting sense.

It will be appreciated to those skilled in the art that the preceding examples and embodiments are exemplary and not limiting to the broad scope of the inventive concepts disclosed herein. It is intended that all modifications, permutations, enhancements, equivalents, and improvements thereto that are apparent to those skilled in the art upon a reading of the specification and a study of the drawings are included within the broad scope of the inventive concepts disclosed herein. It is therefore intended that the following appended claims include all such modifications, permutations, enhancements, equivalents, and improvements falling within the broad scope of the inventive concepts disclosed herein.

What is claimed is:

1. A cable holder assembly, comprising:
a plunger comprised of a cap configured for placement on two adjacent solar module frames and a leg component extending from the cap in between two adjacent solar module frames; and
a base comprised of a receptacle and at least one J-shaped hook comprising a proximal end located at an external surface of the base and extending outwardly and away from the external surface until reaching a distal end of the J-shaped hook, where
the J-shaped hook is configured to receive and support at least one electrical cable between its proximal and distal ends,
the leg component is configured with a rack of teeth, and
the receptacle is comprised a pawl with teeth complementary to the rack of teeth and configured to receive an insertion of the leg component, where
the plunger is unconnected to the base prior to the insertion.

2. The cable holder assembly of claim 1, wherein the pawl and the complementary portion of the teeth of the rack form a ratchet when engaged with each other.

3. The cable holder assembly of claim 1, wherein the teeth of the pawl are positioned within the receptacle.

4. The cable holder assembly of claim 1, wherein the teeth of the pawl are configured to engage a complementary portion of the teeth of the rack after the insertion of the leg component.

5. The cable holder assembly of claim 1, wherein the pawl is configured to receive an application of force to facilitate a disengagement of the teeth of the pawl from the complementary portion of the teeth of the rack when engaged.

6. The cable holder assembly of claim 1, wherein the plunger is further comprised with a first gap and the base is further comprised with a second gap to form an unobstructed alignment between the first gap and the second gap to facilitate an insertion of a tool into the second gap to perform a disengagement of the teeth of the pawl from the complementary portion of the teeth of the rack when engaged.

7. A cable holder assembly, comprising:
a plunger comprised of a cap with a substantially flat lower surface, a pair of stops configured for placement in between and frictional engagement with two adjacent solar module frames, and a leg component in between the pair of stops, where
the pair of stops and the leg component extend vertically from the substantially flat lower surface; and
a base with an upper end and a lower end opposite of the upper end and comprised of a substantially vertical receptacle and at least J-shaped one hook comprising a proximal end located at an external surface of the base and extending outwardly and away from the external surface until reaching a distal end of the J-shaped hook, where
the J-shaped hook is configured to receive and support at least one electrical cable between its proximal and distal ends,
the leg component is configured with a rack of teeth, and
the receptacle is comprised a pawl with teeth complementary to the rack of teeth and configured to receive an insertion of the leg component at the upper end.

8. The cable holder assembly of claim 7, wherein the pawl and the complementary portion of the teeth of the rack form a ratchet when engaged with each other.

9. The cable holder assembly of claim 7, wherein the teeth of the pawl are positioned within the receptacle.

10. The cable holder assembly of claim 7, wherein the teeth of the pawl are configured to engage a complementary portion of the teeth of the rack after the insertion of the leg component.

11. The cable holder assembly of claim 7, wherein the pawl is configured to receive an application of force to facilitate a disengagement of the teeth of the pawl from the complementary portion of the teeth of the rack when engaged.

12. The cable holder assembly of claim 7, wherein the plunger is further comprised with a first gap and the base is further comprised with a second gap to form an unobstructed alignment between the first gap and the second gap to facilitate an insertion of a tool into the second gap to perform a disengagement of the teeth of the pawl from the complementary portion of the teeth of the rack when engaged.

* * * * *